UNITED STATES PATENT OFFICE.

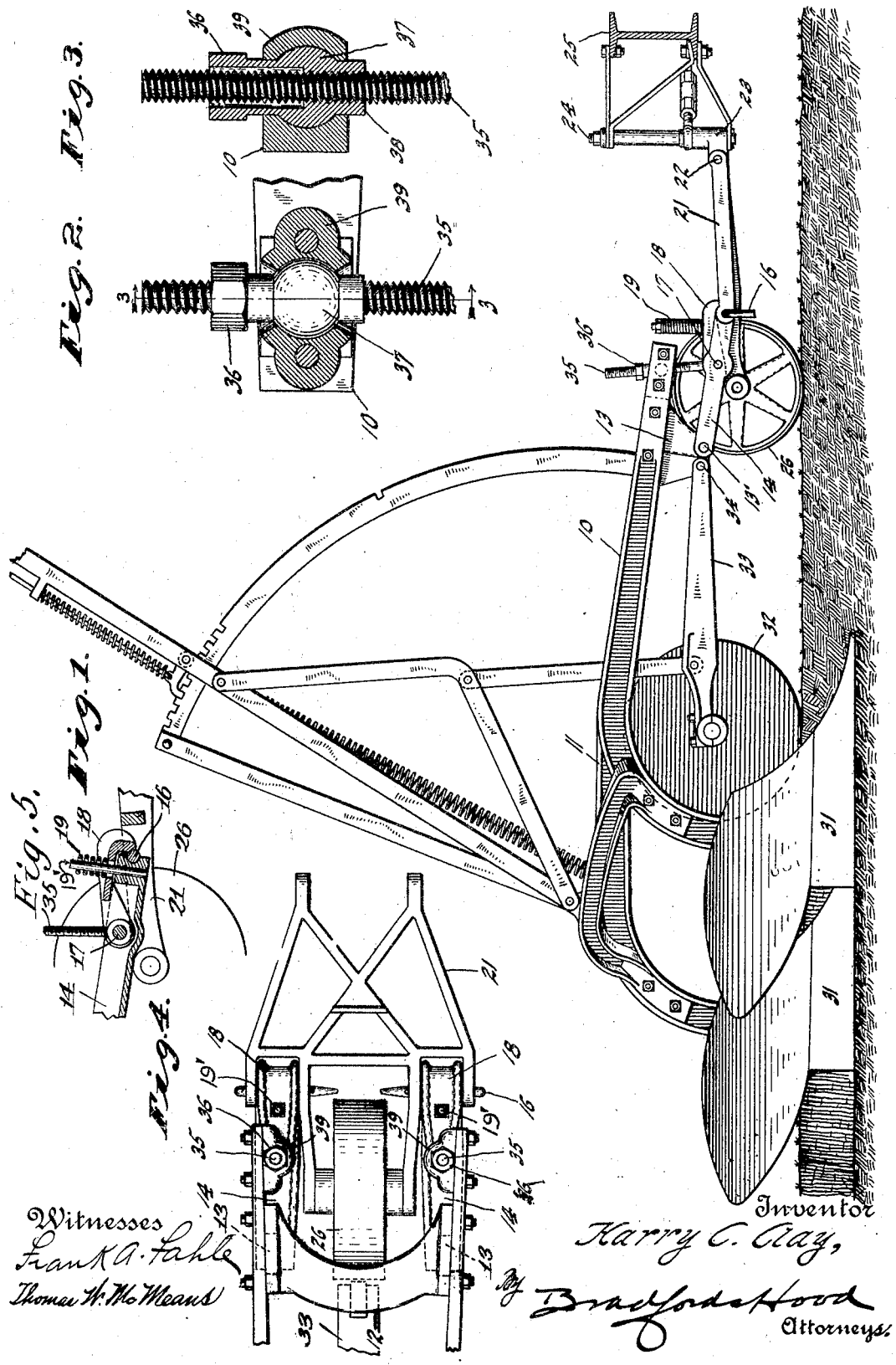

HARRY C. CLAY, OF COLUMBUS, INDIANA, ASSIGNOR TO REEVES & COMPANY, OF COLUMBUS, INDIANA, A CORPORATION OF INDIANA.

GANG-PLOW.

976,721.  Specification of Letters Patent.  Patented Nov. 22, 1910.

Application filed April 8, 1910. Serial No. 554,133.

*To all whom it may concern:*

Be it known that I, HARRY C. CLAY, a citizen of the United States, residing at Columbus, in the county of Bartholomew and State of Indiana, have invented a new and useful Gang-Plow, of which the following is a specification.

The object of my invention is to provide an improved connection between a plow unit and a draft frame by means of which the unit may be readily adjusted for proper action of the plow shares in the ground, the structure being especially designed for use in gang plows where several plow units of two furrowers each are flexibly connected to a main draft frame.

The accompanying drawings illustrate my invention.

Figure 1 is a side elevation; Fig. 2 a fragmentary detail of one of the adjusting nuts and associated parts; Fig. 3 a section on line 3—3 of Fig. 2; Fig. 4 a fragmentary plan, and Fig. 5 a sectional detail of the connection between frame 21 and the plow unit.

In the drawings, 10 and 11 indicate a pair of plow beams which are rigidly connected together to form a unit. Connecting the forward ends of the two beams 10 and 11 is a bracket 12 having a pair of depending portions 13 to the lower end of each of which is pivoted, at 13', a link 14 having a forwardly presented notch at its forward end adapted to receive a cross-pin 16. A pin 17 extends across between each pair of links at an intermediate point in their length and pivoted on this pin is a clamping finger 18 which has a downwardly presented finger also adapted to engage pin 16. A spring 19 on a bolt 19' serves to clamp the links 14 and finger 18 upon the pin 16 with a yielding force, in a well-known manner, so that too great a resistance offered to the plow will cause the spring 19 to yield and the plow unit to be thus disconnected from the draft frame.

The pins 16 are carried at an intermediate point in the length of a draft frame 21 which is pivotally connected on a horizontal pivot 22 to the fitting 23 which is mounted upon a vertical pivot 24, the said vertical pivot being connected to the main draft frame 25. At its rear end the draft frame 21 is provided with a supporting wheel 26.

The depth of cut of the plow shares 31 is determined by a gage wheel 32 which is carried at the rear end of a frame 33 pivoted at its forward end at 34 to bracket 12. Different positions of adjustment of the wheel 32 and different conditions of soil require varying positions of the beams 10 and 11 relative to the surface of the ground but any position of adjustment must be rigidly maintained during plowing operation. For that purpose I pivot upon each pin 17 the lower end of a threaded stem or tie rod 35 the threaded upper end of which is threaded through an adjusting nut 36. Nut 36 is provided with a ball 37 which is seated in a socket 38 formed in the inner face of the adjacent plow beam 10 or 11, and is held in place by a socketed clamping strap 39, the arrangement being such that a limited forward and backward swing of the nut in its clamp may be had to allow for the variation due to an adjustment of the nut on its stem.

By independently adjusting the two nuts 36 the plow unit may be canted laterally to some extent in order to compensate for any slight difference of draft of the two plow shares. An adjustment of both the nuts in the same direction upon their stems causes a swinging of the plow unit upon the pivots 13' at the rear ends of links 14 thus producing the same effect as is produced by shifting the point of draft attachment to a plow beam by an ordinary vertically adjustable clevis.

By this arrangement it is possible to very quickly and easily adjust the draft connection between the plow unit and the draft frame 21, even during plowing operation, so as to obtain a perfect draft upon the plows.

I claim as my invention:—

1. The combination, with a plow, of a draft frame, a link pivotally connected at its rear end to the plow beam and connected at its forward end to the draft frame, a threaded tie rod and a nut, said tie rod and nut forming a connection between the forward end of the plow beam and the link forward of its pivotal connection with the plow beam, for the purpose set forth.

2. The combination, with a plow, of a draft frame, a link pivotally connected at its rear end to the plow beam and connected at its forward end to the draft frame, a threaded tie rod connected to said link at an intermediate point, a ball-shaped nut threaded upon said tie rod, and a socket connection between said nut and the plow beam.

3. The combination, with a plow unit comprising two plows, of a draft frame, two links each pivotally connected at its rear end to a plow beam and connected at its forward end to the draft frame, a threaded tie rod and a nut for each link, said tie rod and nut forming a connection between the forward end of its plow beam and its link forward of its pivotal connection with the plow beam, for the purpose set forth.

4. The combination, with a plow unit comprising two plows, of a draft frame, two links each pivotally connected at its rear end to a plow beam and connected at its forward end to the draft frame, a threaded tie rod connected to each link at an intermediate point, a ball-shaped nut threaded upon said tie rod, and a socket connection between said nut and a plow beam.

In witness whereof, I, have hereunto set my hand and seal at Columbus, Indiana, this second day of April, A. D. one thousand nine hundred and ten.

HARRY C. CLAY. [L. S.]

Witnesses:
 JOHN H. BACHTEL,
 PERRY KING.